United States Patent [19]

Ostertag et al.

[11] 4,139,351

[45] Feb. 13, 1979

[54] SEPARATION OF FINELY DIVIDED METAL OXIDES, PRODUCED BY COMBUSTION OF METAL CARBONYLS, FROM A STREAM OF GAS

[75] Inventors: Werner Ostertag, Gruenstadt; Franz L. Ebenhoech, Ludwigshafen; Gerd Wunsch, Speyer; Erfried Voelkl, Frankenthal; Theodor Mader, Ludwigshafen, all of Fed. Rep. of Germany

[73] Assignee: BASF Aktiengesellschaft, Ludwigshafen, Fed. Rep. of Germany

[21] Appl. No.: 785,362

[22] Filed: Apr. 7, 1977

[30] Foreign Application Priority Data

May 3, 1976 [DE] Fed. Rep. of Germany ....... 2619084

[51] Int. Cl.² ............................................. B01D 46/00
[52] U.S. Cl. ......................................... 55/97; 55/269; 55/DIG. 25
[58] Field of Search .................. 55/1, 72, 80, 97, 269, 55/315, 337, 456, 461, DIG. 25; 209/11, 144

[56] References Cited

U.S. PATENT DOCUMENTS

| 1,958,577 | 5/1934 | Hirshfeld | 55/461 |
| 2,721,626 | 10/1955 | Riok | 55/72 |
| 3,883,324 | 5/1975 | Balla et al. | 55/1 |

FOREIGN PATENT DOCUMENTS

| 252688 | 6/1964 | Australia | 55/97 |
| 567450 | 2/1945 | United Kingdom | 55/269 |

OTHER PUBLICATIONS

Lapple — Fluid & Particle Mechanics, published by University of Delaware, Newark, Delaware, 3/56, p. 305.

*Primary Examiner*—Bernard Nozick
*Attorney, Agent, or Firm*—Keil & Witherspoon

[57] ABSTRACT

Finely divided metal oxides produced by combustion of metal carbonyls are separated from the stream of gas by filtration. Before filtration, the stream of gas is subjected to a permanent change of direction in a tubular zone. This change of direction must be sufficient to cause a centrifugal acceleration which is from at least 1,000 to 10,000 times the acceleration due to gravity.

6 Claims, No Drawings

SEPARATION OF FINELY DIVIDED METAL OXIDES, PRODUCED BY COMBUSTION OF METAL CARBONYLS, FROM A STREAM OF GAS

Finely divided, soft-grained and very pure iron oxide can be manufactured by combustion of iron carbonyl in air. Generally, the procedure followed is to cause the iron carbonyl, introduced as a fine spray into a reactor, to undergo combustion in an excess of air. The combustion products, which are at above 550° C., are then fed, via an air quench device or via a cooling zone to the devices for separating off the finely divided iron oxide. In this process, the tendency of the iron oxide to settle on cold walls of the cooling devices presents a particular problem. If the hot stream of combustion products is cooled by external cooling, the oxide felts which form on the wall substantially inhibit the requisite heat transfer, which easily leads to damage of the filter installation because of the failure to cool the oxide particles. Progressively thicker caking on the wall can even lead to blockages of the pipelines, which is particularly undesirable.

The conventional measures for preventing or eliminating the oxide caking are unsatisfactory. They are confined to mechanically knocking off the material, or to pneumatic cleaning. The former method of cleaning is labor-intensive and expensive, whilst the latter is relatively ineffective and has the disadvantage that large amounts of air are required to keep the walls free, leading to a frequently unacceptable need to increase the size of the filter. Attempts to avoid oxide caking and blockages by merely increasing the flow velocity of the combustion products have failed. Thus, for example, it has not proved possible in the laboratory to keep a rectilinear tube free even by increasing the flow velocity of the combustion products to above 30 m/sec.

A further problem in the carbonyl combustion process is the separating-off of the solid iron oxide, particularly since the finely divided product (mean particle size up to 50 Å) is always produced together with a very large amount of gas. These problems arise particularly in the manufacture of transparent pigments since they are produced by carrying out the combustion with a very large excess of gas. Thus, according to U.S. Pat. No. 3,918,985, 90 cubic meters of gas are used per kg of iron oxide. Known separating devices such as cyclones prove virtually ineffective in view of the small particle size of the solid and filters must be made excessively large if they are to cope with the large volume of gas in which the solid is suspended in the manner of an aerosol. A further disadvantage of the use of filters as separating devices is that the particles separated off form a tight felt and the pressure on the filter rises greatly within a short time.

It is an object of the present invention to provide a process for separating finely divided metal oxides, produced by combustion of metal carbonyls, from a stream of gas by filtration, in which process the above disadvantages do not arise.

We have found that this object is achieved if the stream of gas containing metal oxide, on its way to the filtration process, is subjected, in a tubular zone, to a permanent change of direction which is sufficient to cause a centrifugal acceleration which is from at least 1,000 to 10,000 times the acceleration due to gravity.

The process may be carried out by inserting a length of tube which is curved, for example in the shape of a spiral or some other shape, between the reactor in which the combustion occurs, and the filter. The cross-section of the tube can be of any desired shape, such as circular, elliptical or even rectangular. The curvature of the tube must be so chosen, in accordance with the velocity of the stream of gas — which is conventionally from 10 to 300 m/sec — that the centrifugal acceleration is from at least 1,000 to 10,000 times the acceleration due to gravity. In case of a spiral tube, the radius required can be calculated on the basis of the stated velocities.

In order to achieve a satisfactory effect, it suffices to select the length of tube so as to give residence times of from 0.1 to 2 seconds at the stated velocities. Within this range, the residence times can be the lower, the higher are the flow velocities and the higher is the selected centrifugal acceleration.

The method according to the invention causes agglomeration of the metal oxide particles so that no significant increase in pressure is observed at the downstream filters even after prolonged operation. The method according to the invention offers the further advantage that the stream of gas can be cooled indirectly, by cooling the tube walls, whilst travelling to the filter, without causing deposits. In this way, direct cooling by admixture of cold gases can be avoided or reduced, and because of the lower resulting amounts of gas this has an advantageous effect on the subsequent filtration; for example, the temperature of the gas can, without disadvantage, be lowered from its conventional value of from 500° to 900° C. to from 10° to 150° C. by indirect cooling.

EXAMPLE 1

(A) 10 kg/hr of iron pentacarbonyl are sprayed into a heated reactor and combusted by means of an excess of air (90 cubic meters (S.T.P.)/h). The stream of combustion products, which is at 600° C., is cooled to below 200° C. with 200 cubic meters (S.T.P.) of air and is fed into a filter vessel, where the finely divided iron oxide is deposited on tubular bag filters which are cleaned off pneumatically.

The filter surface is 24 m$^2$. The mean particle size of the iron oxide powder is 70 Å. The filter material consists of a nylon needle felt which is 2.5 mm thick and has a density of 0.20 g/cm$^3$. Its air permeability is 200 l/min/dm$^2$ under 20 mm water column, according to DIN 53,887. The filter pressure rises progressively with the duration of the experiment and settles, after about 2 hours, at the very high value of 600 mm water column.

(B) The above experiment is carried out under identical conditions except that the quench air is reduced to 40 cubic meters (S.T.P.) and a spiral tube is fitted between the reactor and the filter. The spiral tube consists of a double-walled tube shaped to give a spiral with 11 turns, the diameter of each turn being 550 mm. The internal diameter of the inner tube is 42 mm. The gas flows through the inner tube at a velocity of about 50 m/sec, whilst water at an input temperature of 8° C. flows, in counter-current to the gas, through the annular space between the outer tube and the inner tube. This arrangement results in a centrifugal acceleration of 10,000 m/sec$^2$, corresponding to 1,000 times the acceleration due to gravity. The residence time of the gas in the spiral tube is about 0.4 sec.

Even after 5 days, no deposits are formed in the inner tube. The agglomerating action in the spiral is sufficiently good to enable the filter effortlessly to separate out the iron oxide. The filter feed pressure is always less than 10 mm water column.

EXAMPLE 2

(A) 180 ml/h of iron pentacarbonyl are combusted by means of 150 l/h of air in a heated glass reactor. At the end of the reactor, a further 150 l/h of quench air are admixed to the hot combustion gases. The stream of gas, at 300° C., is then fed to a cyclone through a water-cooled glass spiral. The cooling water is at 8° C. The spiral consists of a 3 m long glass tube shaped into 30 turns, the diameter of each turn being 20 mm. The internal diameter of the glass tube is chosen so that the combustion products have a velocity of 10 m/s, converted to S.T.P. This results in a centrifugal acceleration of 25,000 m/sec$^2$, corresponding to 2,500 times the acceleration due to gravity. The residence time of the gas in the spiral tube is 0.2 sec.

The experiment was continued for several days, during which the spiral remained completely free from deposits. The temperature of the stream of product was less than 50° C. at the end of the spiral and the Fe$_2$O$_3$ powder is sufficiently agglomerated to enable it to be separated off in more than 90% yield in a glass cyclone.

We claim:

1. A process for cooling a gas stream produced by the combustion of metal carbonyls in a reactor and separating finely divided metal oxides contained in said gas stream which comprises:

subjecting the stream of hot gas containing metal oxides in a curved tubular zone to a permanent change of direction which is sufficient to cause a centrifugal acceleration which is from at least 1,000 to 10,000 times the acceleration due to gravity, said curved tubular zone being in the form of a spirally shaped tube, while simultaneously cooling the stream of hot gas externally in the curved tubular zone from a temperature of from 500° to 900° C. to a temperature of from 10° to 150° C., and subsequently filtering the metal oxide from the cooled gas stream.

2. A process as set forth in claim 1, wherein the velocity of the stream of gas in the tubular zone is from 10 m/sec to 300 m/sec.

3. A process as set forth in claim 1, wherein the residence time of the steam of gas in the tubular zone is from 0.1 to 2 sec.

4. A process as set forth in claim 1, wherein a cross-section of the curved tube is circular, elliptical or rectangular.

5. A process as set forth in claim 1, wherein the metal oxide particles are agglomerated in the curved tubular zone.

6. A process as set forth in claim 1, wherein the metal oxide is iron oxide.

* * * * *